(12) United States Patent
Brost

(10) Patent No.: US 6,608,467 B2
(45) Date of Patent: Aug. 19, 2003

(54) REPLACEMENT BATTERY FORMATION SYSTEM

(75) Inventor: Ronald David Brost, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 169 days.

(21) Appl. No.: 09/963,294

(22) Filed: Sep. 26, 2001

(65) Prior Publication Data

US 2003/0057917 A1 Mar. 27, 2003

(51) Int. Cl.$^7$ ............................................... H01M 10/44
(52) U.S. Cl. ......................................... 320/116; 320/130
(58) Field of Search ................................. 320/116, 118, 320/119, 130, 132; 429/61, 91

(56) References Cited

U.S. PATENT DOCUMENTS

| | | | |
|---|---|---|---|
| 3,901,729 A | 8/1975 | Duddy | |
| 4,499,424 A | 2/1985 | Rowlette | |
| 4,551,667 A | 11/1985 | McAuliffe | |
| 4,656,706 A | 4/1987 | Mahato et al. | |
| 5,028,499 A | 7/1991 | Pearce et al. | |
| 5,650,711 A | 7/1997 | Kang | |

Primary Examiner—Edward H. Tso
(74) Attorney, Agent, or Firm—Carlos L. Hanze

(57) ABSTRACT

A replacement battery formation method includes the steps of; providing a bank of batteries made up of a plurality of individual batteries having substantially the same state of formation; cycling a replacement battery by forcing repeated charging and discharging; monitoring a formation state of the replacement battery; ending the cycling when the replacement battery has approximately the same formation state as the plurality of individual batteries; and replacing one of the plurality of batteries with the replacement battery.

13 Claims, 1 Drawing Sheet

REPLACEMENT BATTERY FORMATION SYSTEM

TECHNICAL FIELD

The present invention relates generally to automotive electrical power systems, and more particularly, to a replacement battery formation system.

BACKGROUND ART

Most of today's motor vehicles carry an internal combustion engine that functions optimally at high speeds only. It is by necessity larger than an engine required for "in town" operation. Therefore a penalty is paid for the luxury of broad range operation, including the deterioration of our environment. Emissions during warm-up, low speed, and idle operations are not negligible. A large engine requires longer warm-up time, and short trips may not achieve warm-up in many cases, increasing the pollution problem.

There exists, at the moment, much effort in addressing the basic need for an efficient power source at all operating conditions. One such effort, known as electric vehicle, approaches the problem by carrying an on-board bank of batteries for an electric drive mechanism. Unfortunately, replacement of one battery module in a string of traction battery modules requires that the replacement battery be matched in terms of polarization properties. New batteries are typically not usually fully formed, so a number of "break-in" discharge-charge cycles are performed to complete the formation.

The lead-acid battery formation process involves the conversion of lead oxide and sulfates to concentrated acid in the electrolyte and lead dioxide and porous lead metal on the electrodes. This is accomplished through repeated forced charges and discharges, with each cycle adding to the reservoir of active material. The net result of the formation process is that the charge voltage, which is a function of acid concentration and plate characteristics, is in a period of continual adjustment during formation.

The formation process is time and energy consuming and is often circumvented by only forming the batteries to the point where they are serviceable but not optimized. Then, normal charge and discharge during customer use is used to complete formation.

Economics of electric vehicles, however, requires service to individual cells in the battery string. If a newly produced (under-formed) cell is placed in a well-cycled battery string, the different charge voltage will cause difficulties in charging. Currently, the solution is to produce a stock of replacement cells that have been cycled at least twenty times (to the completely formed state), which presents a substantial cost and time burden. Also, no simple metric exists to determine when formation is complete so it is possible that under-formed cells will be released for customer use.

The disadvantages associated with these conventional replacement battery formation techniques have made it apparent that a new technique for battery formation is needed. The new technique should be capable of providing a means to determine when a battery is fully formed. Additionally, the new technique should be capable of preventing over cycling or under cycling of replacement batteries. The present invention is directed to these ends.

SUMMARY OF THE INVENTION

It is, therefore, an object of the invention to provide an improved and reliable replacement battery formation system. Another object of the invention is to provide a means to determine when a battery is fully formed. Additionally, the new technique should be capable of preventing over cycling or under cycling of replacement batteries.

In accordance with the objects of this invention, a replacement battery formation system is provided. In one embodiment of the invention, a replacement battery formation method includes the steps of; providing a bank of batteries made up of a plurality of individual batteries having substantially the same state of formation; cycling a replacement battery by forcing repeated charging and discharging; monitoring a formation state of the replacement battery; ending the cycling when the replacement battery has approximately the same formation state as the plurality of individual batteries; and replacing one of the plurality of batteries with the replacement battery.

The present invention thus achieves an improved replacement battery formation system. The present invention is advantageous by preventing the over cycling (leading to reduced life and greater cost) or under cycling (leading to defective batteries) of replacement batteries.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
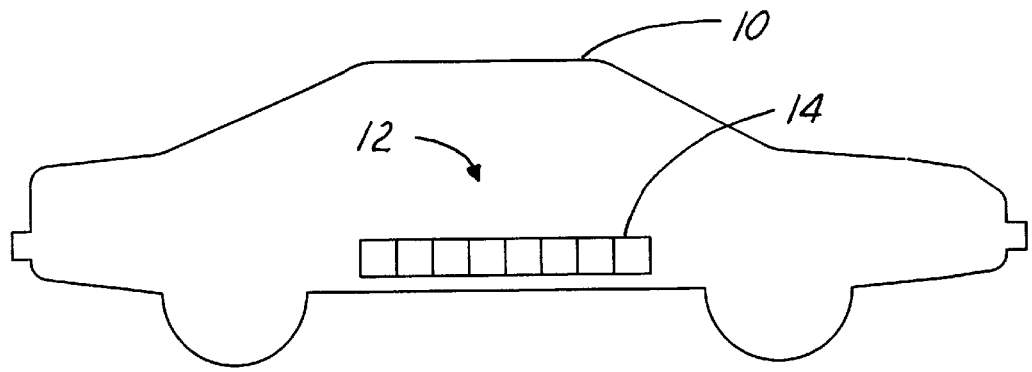
FIG. 1 is a block diagram of an electric vehicle having a battery bank in accordance with one embodiment of the present invention.

In the following figures, the same reference numerals will be used to identify identical components in the various views. The present invention is illustrated with respect to a replacement battery formation system, particularly suited for the automotive field. However, the present invention is applicable to various other uses that may require replacement battery formation systems.

Referring to FIG. 1, a block diagram of an electric vehicle 10 having a battery bank 12 in accordance with one embodiment of the present invention is illustrated. Battery bank 12 is made up of a plurality of individual batteries 14. Replacement of one battery module in a string of traction battery modules requires that the replacement battery be matched in terms of polarization. Replacement batteries are not usually fully formed, so a number of "break-in" discharge-charge cycles are performed to complete the formation.

Economics of an electric vehicle 10 requires service to individual cells 14 in the battery string 12. If a newly produced (under-formed) cell is placed in a well-cycled battery string, the different charge voltage will cause difficulties in charging. The prior art solution is to produce a stock of replacement cells that have been cycled at least twenty times (to the completely formed state), which presents a substantial cost and time burden. Also, no simple metric exists to determine when formation is complete so it is possible that under-formed cells will be released for customer use.

This invention provides a means to determine when the batteries are fully formed, so that over cycling (leading to reduced life and greater cost) or under cycling (leading to defective product) of replacement batteries does not occur.

Figure 2:
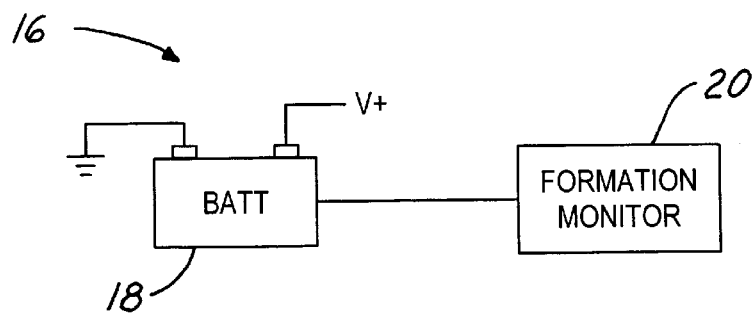
FIG. 2 is a block diagram of a replacement battery formation system in accordance with one embodiment of the present invention.

Referring to FIG. 2, a block diagram of a replacement battery formation system 16 in accordance with one embodiment of the present invention is illustrated. Replacement battery formation system 16 includes a replacement battery 18 undergoing repeated forced charges and discharges (cycling). A formation monitor 20 monitors the formation of replacement battery 18.

Formation monitor 18 may use any technique to detect the onset of recombination (a key characteristic of a fully formed battery). In a preferred embodiment, formation monitor 20 is used to measure the oxygen concentration in the gases produced during the replacement battery 18 cycling recharge process. This information is used to determine when the replacement battery is fully formed and suitable for distribution as replacement modules, identified as the point where the oxygen recombination rate is high enough to reduce the oxygen concentration of the effluent gases to a low threshold value. One skilled in the art would realize that other techniques for detecting the onset of recombination might be used. The function of detecting proper battery formation could be equally fulfilled with hydrogen, carbon dioxide, carbon monoxide, or any suitable trace material analysis.

Figure 3:
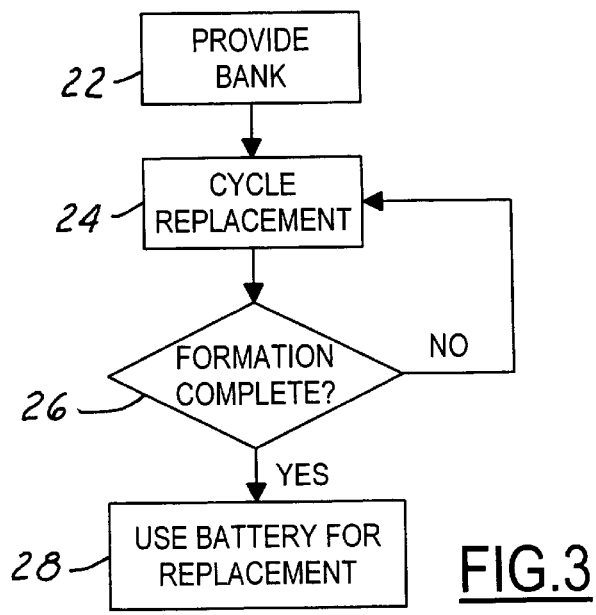
FIG. 3 is a flow chart of a method for replacement battery formation in accordance with one embodiment of the present invention.

FIG. 3 is a flow chart of a method for replacement battery formation in accordance with one embodiment of the present invention. In operation the method for replacement battery formation begins in step by providing a bank of batteries 12. The bank of batteries 12 is comprised of a plurality of individual batteries 14, each having substantially the same state of formation. The sequence then proceeds to step 24 where replacement battery 18 is cycled by forcing repeated charging and discharging.

The sequence then proceeds to step 26. In step 26 the sequence determines if replacement battery 18 is fully formed. If replacement battery 18 not fully formed, then the sequence returns to step 24 for another forced cycle. If replacement battery 18 is fully formed, then the cycling process is stopped and the sequence proceeds to step 28. In step 28, replacement battery 18 is fully formed and may be used to replace one of the plurality of batteries 14.

The present invention thus achieves an improved and reliable replacement battery formation system by monitoring the onset of recombination. In this way, the present invention is capable of providing a means to determine when a battery is fully formed. Additionally, the present invention is capable of preventing over cycling or under cycling of replacement batteries.

From the foregoing, it can be seen that there has been brought to the art a new and improved replacement battery formation system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for replacement battery formation comprising the steps of:

providing a bank of batteries, said bank of batteries comprising a plurality of individual batteries, said plurality of individual batteries each having substantially the same state of formation;

cycling a replacement battery by forcing repeated charging and discharging;

monitoring a formation state of said replacement battery; and ending said cycling when said replacement battery has approximately the same formation state as said plurality of individual batteries.

2. The method for replacement battery formation as recited in claim 1, further comprising the step of replacing one of said plurality of batteries with said replacement battery.

3. The method for replacement battery formation as recited in claim 1, wherein the step of monitoring a formation state of said replacement battery comprises monitoring oxygen concentration in gases produced during the cycling step.

4. The method for replacement battery formation as recited in claim 3, wherein the step of monitoring oxygen concentration in gases produced during the cycling step comprises identifying a point where an oxygen recombination rate is high enough to reduce an oxygen concentration in said gases produced during the cycling step to a predetermined threshold level.

5. The method for replacement battery formation as recited in claim 1, wherein the step of monitoring a formation state of said replacement battery comprises monitoring hydrogen concentration in gases produced during the cycling step.

6. The method for replacement battery formation as recited in claim 1, wherein the step of monitoring a formation state of said replacement battery comprises monitoring carbon dioxide concentration in gases produced during the cycling step.

7. The method for replacement battery formation as recited in claim 1, wherein the step of monitoring a formation state of said replacement battery comprises monitoring carbon monoxide concentration in gases produced during the cycling step.

8. A replacement battery formation system for a bank of batteries comprising a plurality of individual batteries, the plurality of individual batteries each having substantially the same state of formation, said system comprising:

a replacement battery, said replacement battery being cycled by forcing repeated charging and discharging;

a formation monitor coupled to said battery and monitoring a formation state of said replacement battery, said formation monitor stopping said replacement battery from being cycled when said replacement battery has approximately the same formation state as said plurality of individual batteries.

9. The replacement battery formation system as recited in claim 8, wherein said formation monitor detects oxygen concentration in gases produced during the cycling step.

10. The replacement battery formation system as recited in claim 9, wherein said formation monitor detects a point where an oxygen recombination rate is high enough to reduce an oxygen concentration in said gases produced during the cycling step to a predetermined threshold level.

11. The replacement battery formation system as recited in claim 8, wherein said formation monitor detects hydrogen concentration in gases produced during the cycling step.

12. The replacement battery formation system as recited in claim 8, wherein said formation monitor detects carbon dioxide concentration in gases produced during the cycling step.

13. The replacement battery formation system as recited in claim 8, wherein said formation monitor detects sulfur dioxide concentration in gases produced during the cycling step.

* * * * *